US012147922B2

(12) United States Patent
Sun

(10) Patent No.: US 12,147,922 B2
(45) Date of Patent: Nov. 19, 2024

(54) BEVERAGE MAKING SYSTEM BASED ON INTERNET, AND SALES SYSTEM THEREOF

(71) Applicant: Shanghai Hi-Dolphin Robotics Co., Ltd., Shanghai (CN)

(72) Inventor: Qiyun Sun, Shanghai (CN)

(73) Assignee: Shanghai Hi-Dolphin Robotics Co., Ltd., Shanghai (CN)

( * ) Notice: Subject to any disclaimer, the term of this patent is extended or adjusted under 35 U.S.C. 154(b) by 859 days.

(21) Appl. No.: 17/211,949

(22) Filed: Mar. 25, 2021

(65) Prior Publication Data

US 2021/0279666 A1  Sep. 9, 2021

Related U.S. Application Data

(63) Continuation-in-part of application No. PCT/CN2019/087922, filed on May 22, 2019.

(30) Foreign Application Priority Data

Oct. 16, 2018  (CN) .......................... 201811203850.6
Nov. 27, 2020  (CN) .......................... 202022811396.1

(51) Int. Cl.
*A47J 31/52*  (2006.01)
*A47J 31/00*  (2006.01)
(Continued)

(52) U.S. Cl.
CPC ........ *G06Q 10/06316* (2013.01); *A47J 31/00* (2013.01); *A47J 31/521* (2018.08);
(Continued)

(58) Field of Classification Search
CPC ........ A47J 31/521; A47J 31/52; A47J 31/525; A47J 31/002; A47J 44/00
See application file for complete search history.

(56) References Cited

U.S. PATENT DOCUMENTS 11,272,806 B1 *  3/2022  Studor ................. A47J 31/525
2010/0318225 A1 * 12/2010  Claesson ................. B67D 1/07
700/265

(Continued)

FOREIGN PATENT DOCUMENTS

CN  103298383 A  9/2013
CN  104217282 A  12/2014
(Continued)

OTHER PUBLICATIONS

Written Opinion issued by ISA/CN in PCT/CN2019/087922, dated Aug. 28, 2019.
(Continued)

*Primary Examiner* — Reginald Alexander
(74) *Attorney, Agent, or Firm* — Zhu Lehnhoff LLP

(57) ABSTRACT

A beverage making system based on internet includes: a processing device, the quantity of each type of the processing device being one or more; a server, configured to receive order information, search for beverage recipes matching the order information and generate a corresponding order-recipe command list; a control mean, configured to receive the order-recipe command list, deploy an ordering sequence for the received order-recipe command list and control the processing devices corresponding to a current order of unrelated processes to work simultaneously for realizing concurrent processing of a plurality of orders in the ordering sequence. Since an average processing time of a single beverage is shortened, a waiting time of users is reduced and the processing devices of the unrelated processes work cooperatively due to concurrent making of the beverage, the utilization of the processing device is improved while reducing the BOM cost of large-capacity stores. In addition, a beverage sales system applied based on the beverage making system reduces the waiting time for online orders of the
(Continued)

users, realizes diversified services such as flavor package and enhances customer engagement.

7 Claims, 3 Drawing Sheets

(51) Int. Cl.
  *A47J 44/00* (2006.01)
  *B25J 11/00* (2006.01)
  *G06Q 10/0631* (2023.01)
  *G06Q 50/12* (2012.01)
(52) U.S. Cl.
  CPC ........... *A47J 44/00* (2013.01); *B25J 11/0045* (2013.01); *G06Q 50/12* (2013.01); *A47J 31/52* (2013.01)

(56) References Cited

U.S. PATENT DOCUMENTS

| | | | | |
|---|---|---|---|---|
| 2012/0156344 | A1* | 6/2012 | Studor | A47J 31/521 |
| | | | | 426/433 |
| 2019/0259077 | A1* | 8/2019 | Cuppari | G06Q 30/06 |
| 2020/0114523 | A1* | 4/2020 | Knuepfel | G07F 13/06 |
| 2020/0383516 | A1* | 12/2020 | Franke | G07F 9/001 |

FOREIGN PATENT DOCUMENTS

| | | |
|---|---|---|
| CN | 106781036 A | 5/2017 |
| CN | 109409996 A | 3/2019 |

OTHER PUBLICATIONS

Search Report issued by ISA/CN in PCT/CN2019/087922, dated Aug. 28, 2019.

\* cited by examiner

BEVERAGE MAKING SYSTEM BASED ON INTERNET, AND SALES SYSTEM THEREOF

The present application is a continuation-in-part of International Patent Application No. PCT/CN2019/087922, filed on May 22, 2019, which claims the priority of Chinese Patent Application No. 201811203850.6, filed on Oct. 16, 2018, the disclosures of both the international application and Chinese application being incorporated herein by reference. The present application also claims the priority of Chinese Patent Application No. 202022811396.1, filed on Nov. 27, 2020, the disclosure of which is incorporated herein by reference.

FIELD OF THE INVENTION

The present invention relates to the technical field of made-on-site beverage making, in particular, to a beverage making system based on internet and a sales system thereof.

BACKGROUND OF THE INVENTION

With people's pursuit of material level, people's pursuit of spiritual level is getting higher and higher, which can be reflected in the beverage field, such as beverage making. People are pursuing more and more beverage flavors, such as iced beverage, hot beverage, etc.; compared with brewed beverage, people prefer made-on-site beverage, which is not only delicious but also has many flavors.

Compared with brewed beverage, made-on-site beverage takes longer time. If custom-flavored beverage is made, such as iced beverage, iced beverage with whipped cream, it takes longer due to the complicated process.

In addition to complicated making processes, the existing made-on-site device supports the use of APP system to order orders, but making the ordered order can only be performed after the making device inputs and the making process is a step-by-step operation, so that the average processing time for a single cup is longer. The existing method of shortening the average processing time for a single cup is to deploy a plurality of sets of making devices, wherein the plurality of sets of making devices are independent of each other and will not perform cross-work, resulting in higher costs.

SUMMARY OF THE INVENTION

In order to increase the cycle time of made-on-site beverage, make the processing process of made-on-site beverage conform to the fast pace of modern life, and reduce the waiting time for buying the made-on-site beverage while reducing the production cost of making the beverage,
according to a first aspect, the present application provides a beverage making system based on internet, which includes:
various processing devices involved in a making process of made-on-site beverages, the quantity of each type of the processing device being one or more;
a server, configured to receive order information, search for beverage recipes matching the order information and generate a corresponding order-recipe command list;
a control mean in signal communication with the server and various processing devices, configured to receive the order-recipe command list, deploy an ordering sequence for the received order-recipe command list and control the processing devices corresponding to a current order of unrelated processes to work simultaneously for realizing concurrent processing of a plurality of orders in the ordering sequence.

In an embodiment, the control mean includes a master computer and a controller, the master computer and the controller being separate and independent structures;
the master computer is in signal communication with the server for receiving the order-recipe command list and deploying the ordering sequence for the received order-recipe command list;
the controller in signal communication with the master computer and various processing devices, and the controller receives the ordering sequence issued by the master computer to control the processing devices corresponding to the current order of the unrelated processes to work simultaneously for realizing concurrent processing of a plurality of orders in the ordering sequence.

In an embodiment, the control mean includes a master computer and a controller, and the master computer and the controller are integrated into an integrated structure:
the master computer is in signal communication with the server for receiving the order-recipe command list and deploying the ordering sequence for the received order-recipe command list;
the controller in data communication with the master computer and in signal communication with various processing devices, and the controller receives the ordering sequence issued by the master computer to control the processing devices corresponding to the current order of the unrelated processes to work simultaneously for realizing concurrent processing of a plurality of orders in the ordering sequence.

In an embodiment, the controller is stored with several lists of control command protocol combinations formed by combining control command protocols of various processing devices according to different beverage making recipes;
the controller calls the lists of control command protocol combinations corresponding to various orders in the ordering sequence, and sends various control command protocols in the list of control command protocol combinations corresponding to the current order of the unrelated processes to the corresponding processing device according to the processing processes, so that the processing device executes corresponding processing actions according to the received control command protocol to realize the concurrent processing of the plurality of orders.

In an embodiment, after calling the list of control command protocol combinations corresponding to various orders in the ordering sequence, the controller further recombines various control command protocols in the list of control command protocol combinations corresponding to a single order according to the synchronization of executed actions, and synchronously sends the recombined control command protocols to the corresponding food processing device when sending various control command protocols in the list of control command protocol combinations to the food corresponding processing device according to the processing processes, so that a part of related processes in the multi-process making of the single order are carried out synchronously.

In an embodiment, the processing device includes a beverage machine, a grouting machine, an ice making module, a capping machine, a breast pump and a robotic arm;
the beverage machine, the grouting machine, the ice making module, the capping machine, the breast pump and the mechanical arm are in signal communication with the controller respectively, the beverage machine, the grouting machine, the ice making module, the capping machine and the breast pump have unique spatial positions respectively, and the controller controls a motion trajectory of the robotic arm based on the unique spatial positions of the beverage machine, the grouting machine, the ice making module, the capping machine and the breast pump.

According to a second aspect, in an embodiment, a beverage sales system based on internet is provided, which includes an order server and the above beverage making system;

the order server is configured to provide the user with an online reservation order, generate order information based on an order of the user, and issues the order information to the beverage making system;

the beverage making system receives the order information, and controls an action of the processing device matching the order information, so as to complete corresponding beverage making.

In an embodiment, the online reservation order has the following three service modes for the user to choose:

after the user makes an online reservation and places an order, the order is directly placed in a beverage making sequence;

after the user makes the online reservation and places the order, the beverage starts to be made when the user arrives at a beverage making location;

after the user makes the online reservation and places the order, a pickup time is set, and a beverage making time is confirmed based on the pickup time.

In an embodiment, after the user places the order, the order server is further configured to feed back a current estimated completion time of the beverage to the user, so that the user picks up the beverage within a best taste time period after the beverage is made.

In an embodiment, the order server is further configured to dynamically increase a priority of making the online reservation order, so that the online reservation order is priorly inserted into the beverage making system.

In an embodiment, the order server increases the priority of making the online reservation order by:

inferring a time required for the user to arrive at the beverage making location according to a distance from a location where the user places the order to the beverage making location;

calculating the possible pickup time of the user based on an ordering time of the user, a time required for the user to arrive at the beverage making location and the average pickup time of the user;

calculating a preliminary beverage making time based on the possible pickup time of the user and a making time of a single cup of the beverage ordered by the user;

calculating a time period during which the beverage may be made based on the preliminary beverage making time and the best taste time period;

increasing the priority of making the online reservation order every once in a while according to the time period during which the beverage may be made.

In an embodiment, the order server is further configured to provide the user with personalized flavor package services, personalized interactive services of the user, and beverage category customization services.

According to the beverage making system of the above embodiments, since an average processing time of a single beverage is shortened, a waiting time of users is reduced and the processing devices of the unrelated processes work cooperatively due to concurrent making of the beverage, the utilization of the processing device is improved while reducing the BOM cost of large-capacity stores as compared with the layout where the plurality of sets of devices are arranged independently. In addition, a beverage sales system applied based on the beverage making system reduces the waiting time for online orders of the users, realizes diversified services such as flavor package, personalized interaction and flavor customization, so as to enhance customer engagement of buying the beverage.

DESCRIPTION OF THE PREFERRED EMBODIMENTS

The present invention will be further explained in detail in combination with the drawings and specific implementation below.

Embodiment One

The present embodiment provides a beverage making system based on internet, which specifically includes various processing devices involved in a making process of made-on-site beverages, a server and a control mean, wherein the control mean includes a master computer and a controller, the control mean may be composed of a separate independent structure of the master computer and the controller so that the control mean is regarded as two independent sets of devices, and correspondingly, the control mean may also be an integrated structure that integrates the master computer and the controller so that the control mean is a set of independent device; the specific design of the control mean is determined according to the actual situation, and there is no specific limitation in the present embodiment.

Figure 1:
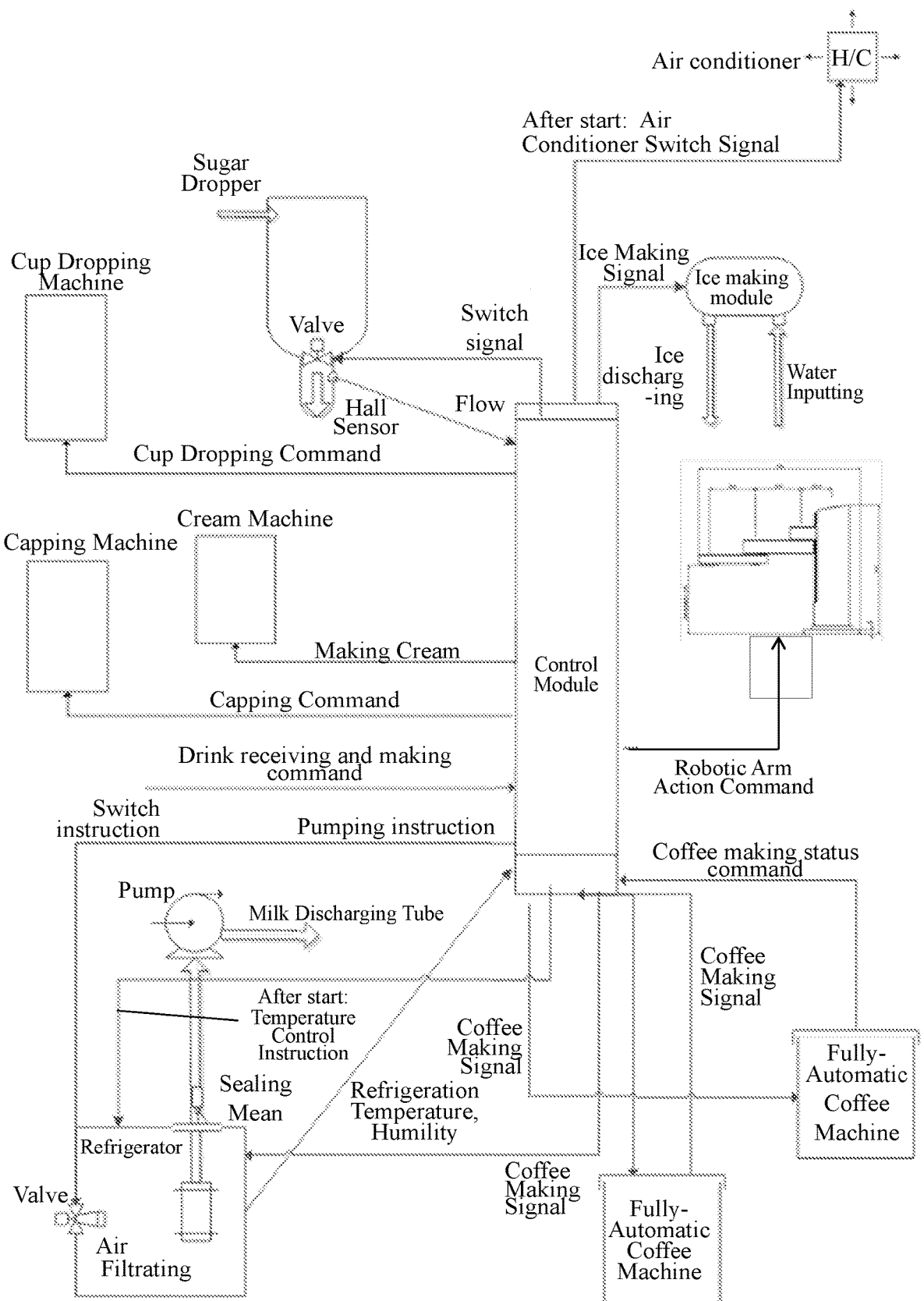
FIG. 1 is a schematic diagram of a beverage making system with single robotic arm.
Figure 2:
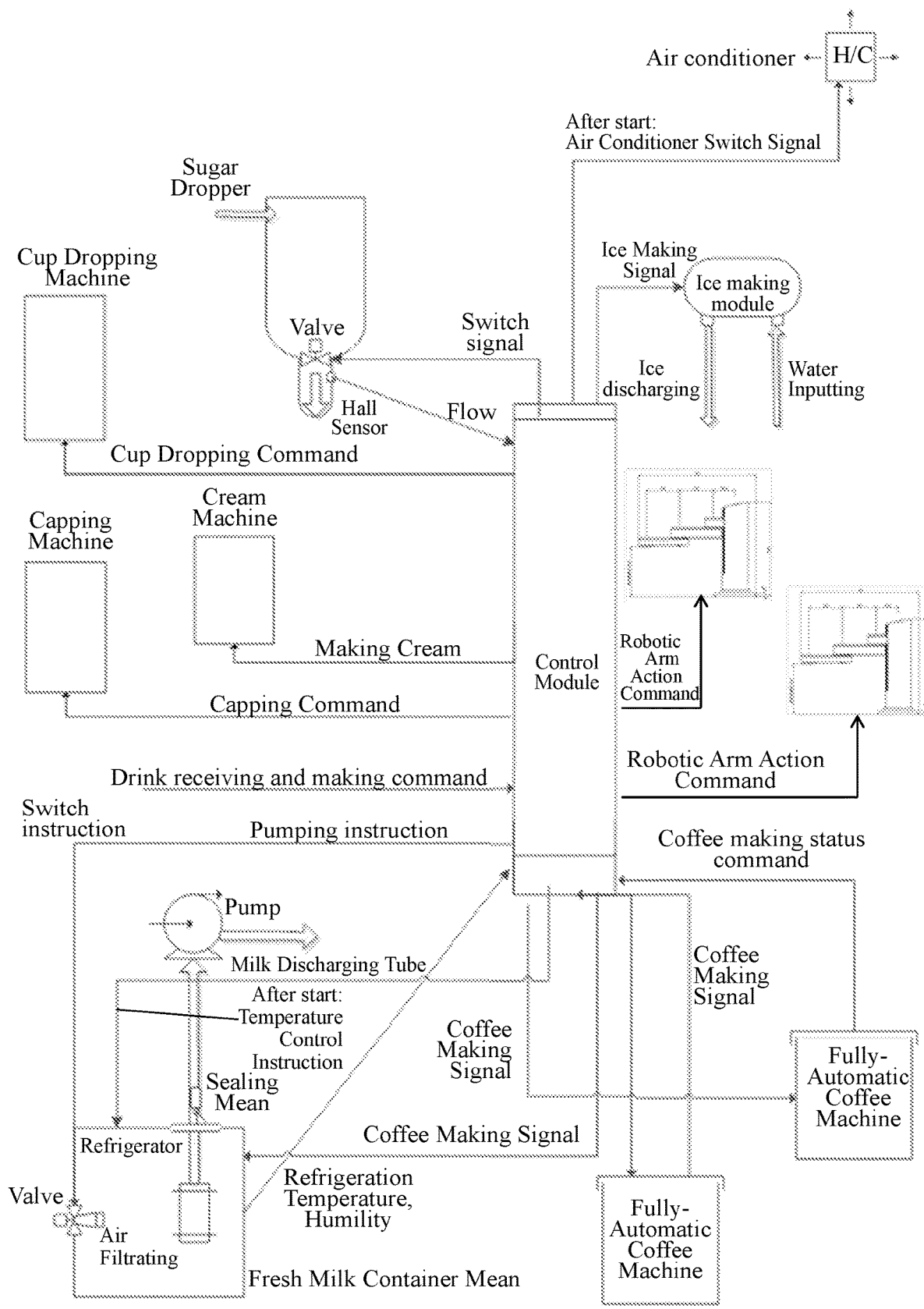
FIG. 2 is a schematic diagram of a beverage making system with a plurality of robotic arms.

When the control mean is designed as a separate structure of the master computer and the controller that are independent of each other, the number of master computer and controller is 1 each; correspondingly, when the control mean is designed as an integrated structure of the master computer and the controller that are integrated with each other, the number of the control mean is also 1. In the present embodiment, the beverage making system is realized with the control mean designed as the separate structure. Further, the number of each type of processing devices may be deployed single or multiple according to the actual situation, and there are many types of processing devices involved in the beverage making process, such as beverage machine, the grouting machine, the ice making module, the capping machine, the breast pump and the mechanical arm etc.; the number of these types of processing devices used is also determined according to the actual size of the beverage room and the input cost, and the present embodiment does not make specific restrictions. The principle diagram of parallel beverage making with a single robotic arm is shown in FIG. 1, and the principle of parallel beverage making with the plurality of robotic arms is shown in FIG. 2.

The characteristic of the beverage making system in the present embodiment is to realize the parallel making of a plurality of cups of beverages to beak the barriers of single-cup making in the current beverage making system. In other words, in the beverage making system of the present application, there is no waiting time interval between the two beverage making processes before and after, thereby shortening the average processing time of a single cup of beverage. The various processing devices involved in the beverage making system of the present embodiment is not an independent superposition between a single set of device, but a communication-based control command protocol to work together, so as to decrease the cost of processing devices.

Specifically, in the present embodiment, the server is configured to receive order information, search for beverage recipes matching the order information and generate a corresponding order-recipe command list, the control mean, in signal communication with the server and the various processing devices, is configured to receive the order-recipe command list, deploy an ordering sequence for the received order-recipe command list and control the processing devices corresponding to a current order of unrelated processes to work simultaneously for realizing concurrent processing of a plurality of orders in the ordering sequence. For the separate control mean, the master computer is in signal communication with the server, and the master computer deploys the ordering sequence for the received order-recipe command list, such as constraint conditions satisfied by the ordering sequence of making and outputting the made-on-site order first, and making the reserved order later than making the made-on-site order.

The controller in signal communication with the master computer and various processing devices, and the controller receives the ordering sequence issued by the master computer to control the processing devices corresponding to the current order of the unrelated processes to work simultaneously for realizing concurrent processing of a plurality of orders in the ordering sequence.

The integrated control mean is different from the separate control mean in that the controller and the master computer are connected through a data line, rather than a wireless signal connection, wherein the controller and the master computer realize the same function. Compared with the separate control mean, the integrated control mean may save the space occupied by the device in terms of space.

Further, in the present embodiment, the controller is stored with several lists of control command protocol combinations formed by combining control command protocols of various processing devices according to different beverage making recipes; the controller calls the lists of control command protocol combinations corresponding to various orders in the ordering sequence, and sends various control command protocols in the list of control command protocol combinations corresponding to the current making order of the unrelated processes to the corresponding processing device according to the processing processes, so that the processing device executes corresponding processing actions according to the received control command protocol to realize the concurrent processing of the plurality of orders.

For example, the above-mentioned non-related processes refer to that the current order A and order B processing processes do not conflict, and may be performed at the same time; since the completion of each process requires a certain amount of time, one processing device may be controlled to execute the C processing process in order A while controlling another processing device to execute the D processing process in order B when the C process in order A and the D process in order B do not conflict in the making process, so as to realize the concurrent processing of the order A and the order B.

The sending various control command protocols in the list of control command protocol combinations to the corresponding food processing devices according to the processing processes may be performed, with the controller, by the following three methods.

In a first method, a corresponding execution time is set for the executed actions associated with various control command protocols; a running time of a current process is timed, and the control command protocol corresponding to a next process is sent to the corresponding processing device when a timed duration reaches the corresponding execution time; the method of sending control command protocols is an open-loop sending mode, so that various processes involved in the beverage processing process is in open-loop switching.

In a second method, a corresponding execution time is set for the executed actions associated with various control command protocols; a signal is fed back by a current processing device when an execution of the current processing device ends, and the control command protocol corresponding to the next process is sent to the corresponding processing device according to the signal; the method of sending the control command protocols is a closed-loop sending method, so that various processes involved in the beverage processing process is in closed-loop switching.

In a third method, a corresponding execution time is set for the executed actions associated with various control command protocols; an open-loop control and a closed-loop control are combined for open-loop switching of one part of front-end and back-end processes of the food processing and for closed-loop switching of the other part of front-end and back-end processes of the beverage processing, wherein the open-loop switching of the front-end and back-end processes includes the following methods: the running time of the current process is timed, and the control command protocol corresponding to the next process is sent to the corresponding processing device when a timed duration reaches the corresponding execution time; the closed-loop switching of the front-end and back-end processes includes the following methods: a signal is fed back by the current processing device when the execution of the current processing device ends, and the control command protocol corresponding to the next process is sent to the corresponding processing device according to the signal. In this way, the various processes involved in the beverage processing process may be switched through the combination of the open-loop and closed-loop according to the specific application; for example, certain front-end and back-end processes are switched through open-loop, and certain front-end and back-end processes are switched through closed-loop, so that this mixed switching may be suitable for complex control of beverage processing.

The above three methods of sending the control command protocols are specifically selected according to actual applications, and the present embodiment does not make specific restrictions.

In addition, in the process of concurrent processing the plurality of orders, the controller further recombines various control command protocols in the list of control command protocol combinations corresponding to a single order according to the synchronization of executed actions, and synchronously sends the recombined control command protocols to the corresponding food processing device when sending various control command protocols in the list of control command protocol combinations to the food corresponding processing device according to the processing processes, so that a part of related processes in the multi-process making of the single order are carried out synchronously.

In other words, in a single order, by synchronously sending the recombined control command protocols to various processing devices, the corresponding processing processes may be performed synchronously to break the existing barriers of working in fixed time sequence in multi-process making, so that the beverage processing cycle is even shorter and further the waiting time for buying the made-on-site beverage is shortened, so as to the problem of long processing time for buying the made-on-site beverage.

In the present embodiment, the beverage machine, the grouting machine, the ice making module, the capping machine, the breast pump, the cream machine and the mechanical arm are in signal communication with the controller respectively, and the beverage machine, the grouting machine, the ice making module, the capping machine, the cream machine and the breast pump have unique spatial positions respectively, so that the controller controls a motion trajectory of the robotic arm based on the unique spatial positions of the beverage machine, the grouting machine, the ice making module, the capping machine, the cream machine and the breast pump.

The detailed description of implementing the beverage making system of the present embodiment is made below with the beverage as coffee, the robotic arm as a single robotic arm and the number of the coffee machine as three.

For the convenience of description, the interaction protocol involved in the present application is defined as follows:

| TYPE  | SUBTYPE | TLV     |
|-------|---------|---------|
| 8 bit | 8 bit   | lengthen |

Type is defined as below:

| TYPE | meaning              |
|------|----------------------|
| 0x01 | Order update         |
| 0x02 | Order status         |
| 0x10 | Command confirmation |

SUBTYPE is defined as below:

| SUBTYPE | meaning           |
|---------|-------------------|
| 0x01    | Made-on-site order |
| 0x02    | Reserved order    |

Subtype of the reserved order is defined as below:

| SUBTYPE | meaning                                              |
|---------|------------------------------------------------------|
| 0x01    | User ID                                              |
| 0x02    | Order time of user terminal                          |
| 0x03    | Time for making a single cup of coffee ordered by user |
| 0x04    | Best taste time period for coffee ordered by user    |

-continued

| SUBTYPE | meaning                       |
|---------|-------------------------------|
| 0x05    | Location where user places order |
| 0x06    | Average pickup time of user   |

Category of TLV is defined as below:

| CATETORY | meaning                   |
|----------|---------------------------|
| 0x01     | Number of coffee beans    |
| 0x02     | Types of coffee beans     |
| 0x03     | Milk dosage               |
| 0x04     | With or without ice cubes |
| 0x05     | Caramel dosage            |
| 0x06     | Chocolate sauce dosage    |
| 0x07     | Matcha sauce dosage       |
| 0x08     | Passion jam dosage        |
| 0x09     | Matcha powder dosage      |
| 0x0A     | Cinnamon powder weight    |
| 0x0B     | Chocolate powder weight   |
| 0x0C     | Vanilla powder weight     |
| 0x0D     | With or without cream     |
| 0X0E     | Hot water weight          |
| 0X11 Resv | Coffee type              |
| 0x11     | Coffee bean grinding sequence |
| 0x12     | Hot water sequence        |
| 0x13     | Milk sequence             |
| 0x14     | Ice cube sequence         |
| 0x15     | Caramel sequence          |
| 0x16     | Chocolate sauce sequence  |
| 0x17     | Matcha sauce sequence     |
| 0x18     | Passion jam sequence      |
| 0x19     | Matcha powder sequence    |
| 0x1A     | Cinnamon powder sequence  |
| 0x1B     | Chocolate powder sequence |
| 0x1C     | Vanilla powder sequence   |
| 0x1D     | Cream sequence            |

Coffee type table of the present embodiment is as below:

| No.  | Name            |
|------|-----------------|
| 0x01 | American coffee |
| 0x02 | Latte           |
| 0x03 | Cappuccino      |

Coffee bean type tab e is as below:

| No. | Name |
|---|---|
| 0x01 | LAVAZZA coffee bean |
| 0x02 | Cafetown coffee bean |
| 0x03 | Illy coffee bean |
| 0x04 | Colin coffee bean |
| 0x05 | Starbucks coffee bean |
| 0x06 | Maxwell coffee bean |
| 0x07 | Jablum coffee bean |
| 0x08 | Nestle coffee bean |

The server receives a made-on-site order of a cup of American coffee from a user A, obtains a recipe ratio of an iced American coffee (the quantity of coffee beans is 14 g, the type of coffee beans is Starbucks coffee beans; the hot water is 270 ml; with ice) after querying data, and generate order-recipe commands as below:

| TYPE | SUBTYPE | TYPE | LENGTH | VALUE | TYPE | LENGTH | VALUE |
|---|---|---|---|---|---|---|---|
| 0x01 | 0x01 | 0x01 | 1 | E | 0x02 | 1 | 0x05 |

| TYPE | LENGTH | VALUE | TYPE | LENGTH | VALUE | | VALUE |
|---|---|---|---|---|---|---|---|
| 0x04 | 0x01 | 1 | 0x0E | 0x01 | F0 | 0x01 | 0x0E |

| TYPE | LENGTH | VALUE |
|---|---|---|
| 0x11 | 0x01 | 1 |

The server receives a made-on-site order of a cup of Latte coffee with sugar from a user B, obtains a recipe ratio of a latte coffee (the quantity of coffee beans is 14 g, the type of coffee beans is Starbucks coffee beans; the hot water is 140 ml; the fresh milk is 100 ml; with sugar of 10 g) after querying data, and generate order-recipe commands as below:

| TYPE | SUBTYPE | TYPE | LENGTH | VALUE | TYPE | LENGTH | VALUE |
|---|---|---|---|---|---|---|---|
| 0x01 | 0x01 | 0x01 | 1 | E | 0x02 | 1 | 0x05 |

| TYPE | LENGTH | VALUE | TYPE | LENGTH | VALUE | TYPE | LENGTH |
|---|---|---|---|---|---|---|---|
| 0x03 | 0x01 | 0x64 | 0x11 | 1 | 1 | 0x13 | 1 |

| VALUE | TYPE | LENGTH | VALUE | TYPE | LENGTH | VALUE |
|---|---|---|---|---|---|---|
| 2 | 0x05 | 0x01 | 0x0A | 0x0E | 0x01 | 8C |

| TYPE | LENGTH | VALUE |
|---|---|---|
| 0x11 | 0x01 | 0x02 |

The server receives a made-on-site order of a cup of Cappuccino coffee with sugar from a user C, obtains a recipe ratio of a latte coffee (the quantity of coffee beans is 14 g, the type of coffee beans is Starbucks coffee beans; the hot water is 45 ml) after querying data, and generate order-recipe commands as below:

| TYPE | SUBTYPE | TYPE | LENGTH | VALUE | TYPE | LENGTH | VALUE |
|---|---|---|---|---|---|---|---|
| 0x01 | 0x01 | 0x01 | 1 | E | 0x02 | 1 | 0x05 |

| TYPE | LENGTH | VALUE | TYPE | LENGTH | VALUE |
|---|---|---|---|---|---|
| 0x0E | 0x01 | 2D | 0x11 | 0x01 | 0x02 |

At this time, the server may form the generate order-recipe commands into corresponding order-recipe command lists according to orders of the users A, B and C, and issues the order-recipe command lists to the master computer, and then the master computer deploys the ordering sequence for the received order-recipe command lists, and then, the controller controls the processing devices to process the three orders concurrently according to the ordering sequence with processes as shown in the following table:

| Order | Cup | Step | Remarks |
|---|---|---|---|
| 1 | No. 0001 | Cup dropping | |
| 2 | No. 0001 | Pick up cup, move to the next station, drop cup | |
| 3 | No. 0001 | Freshly ground coffee | Coffee Machine A |
| 4 | No. 0002 | Cup dropping | |
| 5 | No. 0002 | Pick up cup, move to the next station, drop cup | |
| 6 | No. 0002 | Freshly ground coffee, milk discharging | Coffee Machine B |
| 7 | No. 0001 | Pick up cup, move to the next station, drop cup | |
| 8 | No. 0003 | Pick up cup, move to the next station, drop cup | |
| 9 | No. 0003 | Freshly ground coffee | Coffee Machine A |
| 10 | No. 0001 | Ice making, ice dropping | |
| 11 | No. 0001 | Pick up cup, move to the next station, drop cup | |
| 12 | No. 0001 | Capping | |
| 13 | No. 0001 | Pick up cup, move to discharge mean | |
| 14 | No. 0002 | Pick up cup, move to the next station, drop cup | |
| 15 | No. 0002 | Drop toppings, caramel | |
| 16 | No. 0002 | Pick up cup, move to the next station, drop cup | |
| 17 | No. 0002 | Ice making, ice dropping | |

-continued

| Order | Cup | Step | Remarks |
|---|---|---|---|
| 18 | No. 0002 | Pick up cup, move to the next station, drop cup | |
| 19 | No. 0002 | Capping | |
| 20 | No. 0002 | Pick up cup, move to discharge mean | |
| 21 | No. 0003 | Cup dropping | |
| 22 | No. 0003 | Pick up cup, move to the next station, drop cup | |
| 23 | No. 0003 | Capping | |
| 24 | No. 0003 | Pick up cup, move to discharge mean | |

Therefore, from the above process table, it is obviously seen that the beverage making system of the present embodiment operates the making processes of three orders concurrently, so as to greatly shorten the completion time of three orders.

In the present embodiment, the ice making machine used in the above processes includes an ice making device, a disinfection agency, and an ice discharging device.

The ice making device includes an ice making chamber, a water inlet mechanism, a water tank, and an ice bucket, wherein the water inlet mechanism is communicated with the water tank, the water tank is communicated with the ice making chamber through a pipe to deliver a pure water to the water tank through the water inlet mechanism, and the water in the water tank enters the ice making device to obtain ice cubes and transport them to the ice bucket; the ice discharging device is communicated with the ice bucket, and the ice cubes in the ice bucket are output through the ice discharging device.

The disinfection mechanism includes an ozone mechanism, an alcohol spray mechanism and a disinfection water delivery mechanism, wherein the ozone mechanism includes an ozone generator and an ozone pipe, and the ozone pipe includes an ozone pipe inlet and an ozone pipe outlet; the ozone pipe inlet is connected to the ozone generator, and the ozone pipe outlet is connected to the ice making device; the ozone generator generates ozone and transports the ozone to the ice making device and the ice discharging device through the ozone pipe to eliminate microorganisms that may breed. The alcohol spray mechanism includes a spray container and a spray pipe, wherein an alcohol used for disinfection is stored in the spray container, and the spray pipe includes a spray pipe inlet and a spray pipe outlet; the spray pipe inlet is connected with the spray mechanism, and the spray pipe outlet is connected with the ice making device and the ice discharging device; the alcohol is sprayed into the ice making device and the ice discharging device through the spray mechanism to eliminate the microorganisms that may breed. The disinfection water delivery mechanism includes a disinfection box, a disinfection pipe, wherein the disinfection box is communicated with the ice making device and the ice discharging device through the disinfection pipe for spraying disinfection water into the ice making device and the ice discharging device for disinfection.

Figure 3:
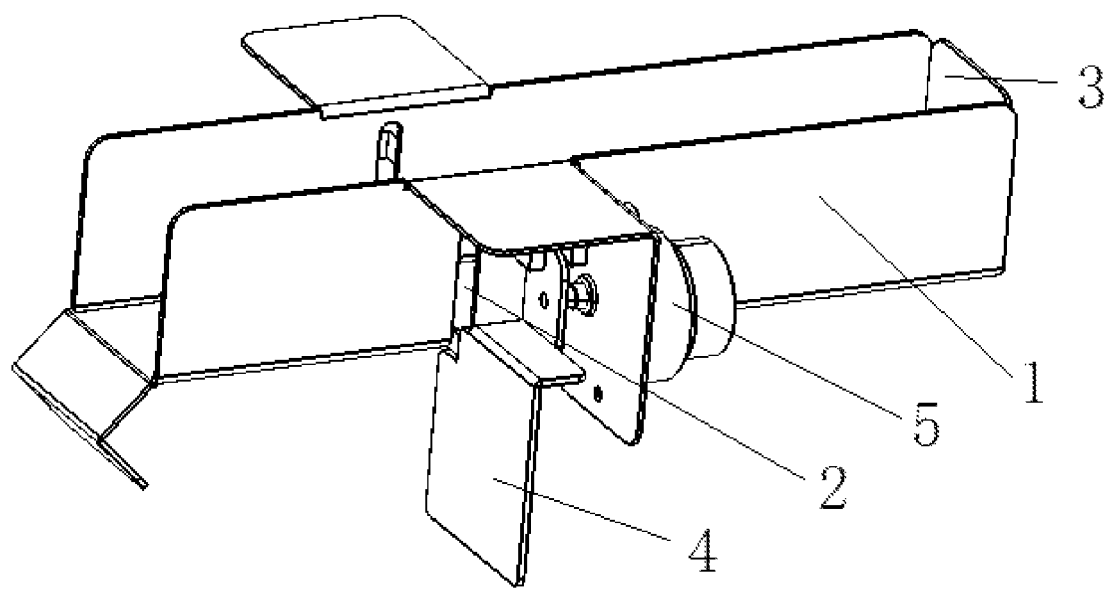
FIG. 3 is a structural schematic diagram of an ice outputting device.

As shown in FIG. 3, the ice discharging device includes an ice discharging pipe and an ice cutting device, the ice discharging pipe is communicated with the ice bucket, and the ice discharging pipe 1 is provided with an ice cutting position 2; the ice discharging pipe 1 is provided with a regulating door 3 that may move along a length direction of the ice discharging pipe 1; the ice cutting device is set at the ice cutting position 2, and the ice cutting device may move along a cross section of the ice discharging pipe 1 to cut the ice in the ice discharging pipe 1; when a certain volume of ice is required, the regulating door 3 moves along a length of the ice discharging pipe 1 until the ice output volume between the ice cutting position 2 and the regulating door 3 is equal to a required ice output volume; the ice making machine outputs the ice cubes into the ice discharging pipe 1, and the ice cutting device cuts and intercepts the ice cubes at the ice cutting position 2; the regulating door is opened, and the ice cubes located between the ice cutting position and the regulating door are output to an external container. In the utility model, through the provision of the ice discharging pipe 1 and the regulating door 3, the ice discharging volume is determined by a pipe diameter and a length of the ice discharging pipe. In the utility model, the pipe diameter of the ice discharging pipe must be fixed, and, the length of the ice discharging pipe between the ice cutting position by moving the regulating door 3 and the regulating door is adjusted to realize the adjustment of the ice output. Each time the ice making device outputs ice to fill the ice discharging pipe 1, and then the ice cube at the ice cutting position is cut by the ice cutting device; then, the regulating door is opened to output the ice cubes between the ice cutting position and the regulating door to obtain a quantitative volume of ice cubes; the excess ice in the ice discharging pipe is intercepted by the ice cutting device and output to a waste water device. In the utility model, the adjustment and precise control of the ice output may be realized through the above technical solution.

Further, a scale mark may also be set on the ice discharging pipe between the ice cutting position and the regulating door, and a length of the ice discharging pipe between the ice cutting position and the regulating door is marked so that a distance of moving the regulating door may be adjusted according to the required ice volume.

Further, the ice discharging pipe 1 is arranged obliquely, and an installation height of one end of the ice discharging pipe 1 where the regulating door 3 is arranged is lower than an installation height of the other end, so that the ice preferentially slides down and fills the ice discharging pipe between the ice cutting position and the regulating door due to the action of gravity to ensure that the ice volume in this area is exactly equal to the required ice volume.

Further, the ice cutting device includes a slice 4 and a first driving device 5; the slice 4 is set at the ice cutting position 2 on the ice discharging pipe 1; a gap is opened at the ice cutting position on the ice discharging pipe 1; the first driving device drives the slice 4 to rotate around the ice discharging pipe 1, and the slice 4 rotates along the cross section of the ice discharging pipe and cuts the ice in the ice discharging pipe through the gap; after the ice cubes are cut, the slice remains in place to intercept the excess ice cubes until the regulating door 3 is opened, and the ice cubes between the ice cutting position 2 and the regulating door 3 fall down into a beverage container such as a cup, and then the slice 4 is moved away, so that the excess ice falls into the waste water device under the ice discharging pipe due to gravity.

Further, the ice discharging device also includes an ice pushing structure that may move along the length of the ice discharging pipe 1, and the ice pushing structure is configured to push the residual ice in the ice discharging pipe to the outside of the ice discharging pipe or to push the ice cubes to fill the gap between the ice cutting position and the ice discharging pipe. Specifically, the ice pushing structure is arranged on the end of the ice discharging pipe 1 opposite to the regulating door 3, and moving the ice pushing structure toward the regulating door 3 may push the ice cubes to move towards the regulating door.

The control between the ice making device, the disinfection mechanism and the ice discharging device and the control device are all implemented based on the control commands.

Embodiment Two

Based on Embodiment one, the present embodiment provides a beverage sales system based on internet, which includes an order server and the beverage making system detailedly described in Embodiment one.

The order server is configured to provide the user with an online reservation order, generate order information based on an order of the user, and issues the order information to the beverage making system;

the beverage making system receives the order information, and controls an action of the processing device matching the order information, so as to complete corresponding beverage making.

In the present embodiment, the beverage sales system not only support reserved orders, but also shortens the completion time of the orders through the beverage making system in Embodiment one, so that the online order of the beverage sales system in the present embodiment may be completed quickly, reducing the waiting time of users' online orders.

In the present embodiment, the order server provides the user with the following three services of online reservation order for the user to choose corresponding services according to actual situation:

first: after the user makes an online reservation and places an order, the order is directly placed in a beverage making sequence;

second: after the user makes the online reservation and places the order, the beverage starts to be made when the user arrives at a beverage making location;

third: after the user makes the online reservation and places the order, a pickup time is set, and a beverage making time is confirmed based on the pickup time.

In addition, after the user places the order, the order server is further configured to feed back a current estimated completion time of the beverage to the user, so that the user picks up the beverage in time within a best taste time period after the beverage is made.

The beverage sales system of the present embodiment may realize simultaneous making of a plurality of orders, and may dynamically increase the priority of online reservation order making in the case that the user makes an appointment to place an order, so that the online reservation orders are inserted into the beverage making system first, and the waiting time for the user to let the user pick up the beverage within the best taste time of the beverage as far as possible.

In the present embodiment, the order server increases the priority of making the online reservation order specifically, based on an order time of the user, a making time of a single cup of the beverage ordered by the user, a best taste time period after the beverage ordered by the user is made, a location where the user places the order and an average pickup time of the user, by:

inferring a time required for the user to arrive at the beverage making location according to a distance from a location where the user places the order to the beverage making location; the inference may be calculated by the historical location and historical arrival time of the user;

calculating the possible pickup time of the user based on an ordering time of the user, a time required for picking up the beverage and the average pickup time of the user; possible pickup time of user=order time of user+ time required for user to arrive at beverage making location+average pickup time of user;

calculating a preliminary beverage making time based on the possible pickup time of the user and a making time of a single cup of the beverage ordered by the user; preliminary coffee making time=possible pickup time of user-making time of a single cup of the beverage ordered by user;

calculating a time period during which the beverage may be made based on the preliminary beverage making time and the best taste time period; time period during which the coffee may be made=(preliminary coffee making time-best taste time period×20%, preliminary coffee making time+best taste time period×50%);

increasing the priority of making the online reservation order every once in a while (such as, time period during which coffee may be made×10%) according to the time period during which the beverage may be made, and trying to insert the current beverage order into the beverage making sequence.

Further, in order to increase the engagement between the beverage sales service and the user, in the present embodiment, the order server is further configured to provide the user with personalized flavor package services, personalized interactive services of the user, and beverage category customization services.

Taking the beverage that is the coffee as an example, the application of personalized flavor package services is as below:

In an App of the coffee house or WeChat applet, after the user has placed an order (in particular, when the coffee house is busy, or when the user stays on the flavor selection interface for a long time), the user is prompted "Are there any flavors you want to drink but the coffee house does not currently provide?" The user clicks OK and enters the "new coffee category check interface" to prompt the user to check some more varieties of coffee. Or the user click Other to fill in the coffee category or the ingredient elements he wants to add to the coffee.

The category ranking in the new coffee category check interface will be adjusted according to the selection of the user in this coffee house region. For example, after the selection when the coffee house has more than 100 users, the system may cancel the user to fill in the coffee category by himself; for example, after the selection when the coffee house has more than 200 users, the categories that the top 5 users most want to add are remained; when a category is checked for more than 500 users, the coffee customization system is activated.

The system will submit information such as the new coffee flavors that need to be customized and regions to the new coffee research and development department for research and development. After the research and development is completed, priority will be given to the promotion of the new coffee flavor in the region where the flavors are proposed and other regions. If the making capacity of the category of the coffee house in the region is saturated, the coffee category with poor sales will be replaced.

The application of personalized interactive service and customization of the coffee category by the user is as below:

A mini game will be pushed to prompt the user to do some question and answer choices before placing an order (especially when the coffee house is busy), and through these questions and answers and selections, the flavor customization system of the coffee house will guess the users flavor for fine-tuning the proportion of the coffee selected by the user. Whether the fine-tuning is successful (whether the flavor caters to the user) may be confirmed after the user finishes the coffee (after the best time for coffee flavor is over), wherein the user is prompted to enter the coffee flavor evaluation interface through the coffee house's App and WeChat applet for proposing evaluation selection such as scent, acidity, bitterness, sweetness, quantity of fresh milk, and quantity of tea according to the coffee category ordered by the user.

The mini game is designed by market researchers, and the user's preferences are obtained through questionnaire surveys (for example, a user likes green apples and sour drinks). The mini-game design asks users whether they like bananas or green apples by a method of cutting fruits. If the user cuts the green apple in a short period of time, the acidity will be increased by one level when the coffee is made. The foregoing uses particular examples to explain the present invention and is only to help in understanding the present invention and are not limiting of the present invention. For those skilled in the art to which the present invention belongs, according to the idea of the present invention, several simple deductions, modifications or substitutions can also be made.

What is claimed is:

1. A beverage making system based on internet, comprising:
    various processing devices involved in a making process of made-on-site beverages, the quantity of each type of the processing device being one or more;
    a server, configured to receive order information, search for beverage recipes matching the order information and generate a corresponding order-recipe command list;
    a control device in signal communication with the server and various processing devices, configured to receive the order-recipe command list, deploy an ordering sequence for the received order-recipe command list and control the processing devices corresponding to a current order of unrelated processes to work simultaneously for realizing concurrent processing of a plurality of orders in the ordering sequence, wherein the processing device includes a beverage machine, a syrup machine, an ice making module, a capping machine, a breast pump and a robotic arm; and
    wherein the beverage machine, the syrup machine, the ice making module, the capping machine, the breast pump and a mechanical arm are in signal communication with the controller respectively, the beverage machine, the syrup machine, the ice making module, the capping machine and the breast pump have unique spatial positions respectively, and the controller controls a motion trajectory of the robotic arm based on the unique spatial positions of the beverage machine, the syrup machine, the ice making module, the capping machine and the breast pump.

2. A beverage sales system based on internet, comprising: an order server and the beverage making system according to claim 1;
    the order server is configured to provide the user with an online reservation order, generate order information based on an order of the user, and issues the order information to the beverage making system;
    the beverage making system receives the order information, and controls an action of the processing device matching the order information, so as to complete corresponding beverage making.

3. The beverage sales system according to claim 2, wherein the online reservation order has the following three service modes for the user to choose:
    after the user makes an online reservation and places an order, the order is directly placed in a beverage making sequence;
    after the user makes the online reservation and places the order, the beverage starts to be made when the user arrives at a beverage making location;
    after the user makes the online reservation and places the order, a pickup time is set, and a beverage making time is confirmed based on the pickup time.

4. The beverage sales system according to claim 2, wherein after the user places the order, the order server is further configured to feed back a current estimated completion time of the beverage to the user, so that the user picks up the beverage within a best taste time period after the beverage is made.

5. The beverage sales system according to claim 2, wherein the order server is further configured to dynamically increase a priority of making the online reservation order, so that the online reservation order is priorly inserted into the beverage making system.

6. The beverage sales system according to claim 2, wherein the order server increases the priority of making the online reservation order by:
    inferring a time required for the user to arrive at the beverage making location according to a distance from a location where the user places the order to the beverage making location;
    calculating the possible pickup time of the user based on an ordering time of the user, a time required for the user to arrive at the beverage making location and the average pickup time of the user;
    calculating a preliminary beverage making time based on the possible pickup time of the user and a making time of a single cup of the beverage ordered by the user;
    calculating a time period during which the beverage may be made based on the preliminary beverage making time and the best taste time period;
    increasing the priority of making the online reservation order every once in a while according to the time period during which the beverage may be made.

7. The beverage sales system according to claim 2, wherein the order server is further configured to provide the user with personalized flavor package services, personalized interactive services of the user, and beverage category customization services.

* * * * *